United States Patent
Li et al.

(10) Patent No.: US 12,353,593 B2
(45) Date of Patent: Jul. 8, 2025

(54) METHOD, DEVICE AND SYSTEM FOR PROTECTING PRIVACY

(71) Applicants: BEIJING WODONG TIANJUN INFORMATION TECHNOLOGY CO., LTD., Beijing (CN); BEIJING JINGDONG SHANGKE INFORMATION TECHNOLOGY CO., LTD., Beijing (CN)

(72) Inventors: Hongyu Li, Beijing (CN); Zuojun Shen, Beijing (CN)

(73) Assignees: BEIJING WODONG TIANJUN INFORMATION TECHNOLOGY CO., LTD., Beijing (CN); BEIJING JINGDONG SHANGKE INFORMATION TECHNOLOGY CO., LTD., Beijing (CN)

( * ) Notice: Subject to any disclaimer, the term of this patent is extended or adjusted under 35 U.S.C. 154(b) by 323 days.

(21) Appl. No.: 17/906,939

(22) PCT Filed: May 25, 2021

(86) PCT No.: PCT/CN2021/095806
§ 371 (c)(1),
(2) Date: Sep. 21, 2022

(87) PCT Pub. No.: WO2021/249181
PCT Pub. Date: Dec. 16, 2021

(65) Prior Publication Data
US 2023/0143063 A1    May 11, 2023

(30) Foreign Application Priority Data
Jun. 10, 2020  (CN) .......................... 202010523734.3

(51) Int. Cl.
*G06F 21/62*    (2013.01)

(52) U.S. Cl.
CPC ............................... *G06F 21/6245* (2013.01)

(58) Field of Classification Search
CPC .................................................. G06F 21/6245
See application file for complete search history.

(56) References Cited

U.S. PATENT DOCUMENTS

2009/0207269 A1   8/2009  Yoda
2016/0155465 A1   6/2016  Park et al.
(Continued)

FOREIGN PATENT DOCUMENTS

CN    105957001 A    9/2016
CN    106778343 A    5/2017
(Continued)

OTHER PUBLICATIONS

Geon-Woo Kim • Su-Gil Choi • Deok-Gyu Lee • Jong-Wook Han; Privacy Preservation in SAT (Single Authentication Through); 2010 2nd International Conference on Information Technology Convergence and Services (2010, pp. 1-4); (Year: 2010).*

(Continued)

*Primary Examiner* — Luu T Pham
*Assistant Examiner* — Chao Wang
(74) *Attorney, Agent, or Firm* — Myers Bigel, P.A.

(57) ABSTRACT

The present disclosure provides a method, a device, and a system for protecting privacy. The method for protecting privacy includes: acquiring video information collected by a camera; performing video segmentation processing on the video information to obtain an original video frame; detecting whether the original video frame comprises privacy information; masking an area comprising the privacy information in the original video frame to generate a masked frame under a condition that the original video frame comprises the privacy information, and taking the masked frame as an output video frame; and taking the original video (Continued)

frame as the output video frame under a condition that the original video frame does not comprise the privacy information.

13 Claims, 4 Drawing Sheets

(56) References Cited

U.S. PATENT DOCUMENTS

| | | | |
|---|---|---|---|
| 2018/0139056 A1* | 5/2018 | Imai | H04L 9/14 |
| 2019/0319792 A1* | 10/2019 | Irwan | H04L 63/0442 |
| 2021/0319144 A1 | 10/2021 | Ishimaru et al. | |
| 2021/0390209 A1 | 12/2021 | Lee et al. | |

FOREIGN PATENT DOCUMENTS

| | | | | |
|---|---|---|---|---|
| CN | 106803930 A | * | 6/2017 | G06K 9/00362 |
| CN | 108012122 A | | 5/2018 | |
| CN | 109474589 A | * | 3/2019 | G06Q 20/3829 |
| CN | 110023987 A | * | 7/2019 | G06T 1/60 |
| CN | 110446062 A | * | 11/2019 | H04N 21/23412 |
| CN | 110516464 A | | 11/2019 | |
| CN | 110719176 A | | 1/2020 | |
| CN | 111199485 A | * | 5/2020 | G06F 16/2471 |
| CN | 111866600 A | | 10/2020 | |
| EP | 3352456 A1 | | 7/2018 | |
| JP | 2009194687 A | | 8/2009 | |
| JP | 2010165027 A | | 7/2010 | |
| KR | 20130032856 A | | 4/2013 | |
| KR | 20160066068 A | | 6/2016 | |
| KR | 20200019059 A | | 2/2020 | |
| KR | 20200053239 A | | 5/2020 | |
| WO | 2020049958 A1 | | 3/2020 | |

OTHER PUBLICATIONS

Enting Guo • Peng Li • Shui Yu • Hao Wang; Efficient Video Privacy Protection Against Malicious Face Recognition Models; IEEE Open Journal of the Computer Society (vol. 3, 2022, pp. 271-280); (Year: 2022).*
S. Lokesh • M. Anto Bennet • N. Priya • D. Chitra • S. Karthika • K. Divyakanni; An efficient security for privacy information through hiding data in encrypted compressed videobit streams; 2016 International Conference on Communication and Electronics Systems (ICCES) (2016, pp. 1-8); (Year: 2016).*
"Decision to Grant a Patent", JP Application No. 2022-565897, Aug. 13, 2024, 5 pp.
"Notice of Reasons for Refusal and English-language translation", JP Application No. 2022-565897, Jul. 1, 2024, 6 pp.
"First Office Action and English language translation", CN Application No. 202010523734.3, Apr. 19, 2021, 20 pp.
"International Search Report and Written Opinion of the International Searching Authority (with English language translation of ISR)", International Application No. PCT/CN2021/095806, Jul. 22, 2021, 12 pp.
"Request for the Submission of an Opinion" and English language translation, KR Application No. 10-2023-7000625, Sep. 23, 2024, 16 pp.
Lee, Donghyeok, et al., "CCTV Video Privacy Protection Scheme Based on Edge Blockchain" with English language Abstract, Journal of KIIT, vol. 17, No. 10, Oct. 31, 2019, pp. 101-113.
Notice of Allowance and English language translation, KR Application No. 10-2023-7000625, Apr. 23, 2025, 5 pp.

* cited by examiner

METHOD, DEVICE AND SYSTEM FOR PROTECTING PRIVACY

CROSS-REFERENCE TO RELATED APPLICATIONS

The present disclosure is a U.S. National Stage Application under 35 U.S.C. § 371 of International Patent Application No. PCT/CN2021/095806, filed on May 25, 2021, which is based on and claims the priority of CN application No. 202010523734.3 filed on Jun. 10, 2020, the disclosure of both of which are which is incorporated herein by reference in its entirety.

TECHNICAL FIELD

The present disclosure relates to the field of security, and in particular, to a method, a device, and a system for protecting privacy.

BACKGROUND

With the increasing concern about security, more and more surveillance video equipment are installed in various public places. While most of the public hold an agreed attitude towards intensive surveillance in curbing crimes, people generally do not accept invasive monitoring of their private life. Currently, people are being observed by countless eyes wherever they go, and whether they are aware of it. This situation has aroused wide attention concerning invasion of individual privacy.

SUMMARY

According to a first aspect of embodiments of the present disclosure, a method for protecting privacy executed by an edge device is provided. The method comprises: acquiring video information collected by a camera; performing video segmentation processing on the video information to obtain an original video frame; detecting whether the original video frame comprises privacy information; masking an area comprising the privacy information in the original video frame to generate a masked frame under a condition that the original video frame comprises the privacy information, and taking the masked frame as an output video frame; and taking the original video frame as the output video frame under a condition that the original video frame does not comprise the privacy information.

In some embodiments, the above method further comprises: detecting whether the masked frame comprises preset behavior information; and sending the masked frame to a corresponding blockchain node under a condition that the masked frame comprises the preset behavior information, thereby the blockchain node storing the masked frame into a storage server.

In some embodiments, the masking the area comprising the privacy information in the original video frame comprises: generating an image mask by using a pre-generated public key; shielding the area comprising the privacy information in the original video frame by the image mask to generate the masked frame.

In some embodiments, the masking the area comprising the privacy information in the original video frame further comprises: sending a private key corresponding to the public key to the blockchain node, thereby the blockchain node storing the private key.

In some embodiments, the above method further comprises: extracting a certificate from an access request sent by a user terminal through a blockchain network, wherein the certificate is issued by the blockchain node to the user terminal after the user terminal passes authentication; determining whether the user terminal has an access right according to the certificate; providing the output video frame to the user terminal for playing under a condition that the user terminal is determined to have the access right according to the certificate.

In some embodiments, the above method further comprises: removing the image mask of the masked frame in the output video frame by using the private key to obtain a video frame without the image mask under a condition that a private key provided by the user terminal is received, wherein the private key is obtained from a blockchain node by the user terminal; sending the video frame without the image mask to the user terminal for playing.

In some embodiments, the above method further comprises: detecting the number of generated masked frames in the process of providing the output video frame to the user terminal; interrupting a connection between the edge device and the blockchain network under a condition that the number of the generated masked frames is greater than a preset threshold.

In some embodiments, the above method further comprises: interrupting the connection between the edge device and the blockchain network according to an instruction of interruption sent by the user terminal in the process of providing the output video frame to the user terminal.

According to a second aspect of embodiments of the present disclosure, an edge device for protecting privacy is provided. The edge device comprises: a memory configured to store instructions; a processor coupled to the memory, wherein based on the instructions stored in the memory, the processor is configured to: acquire video information collected by a camera; perform video segmentation processing on the video information to obtain an original video frame; detect whether the original video frame comprises privacy information; mask an area comprising the privacy information in the original video frame to generate a masked frame under a condition that the original video frame comprises the privacy information, and take the masked frame as an output video frame; take the original video frame as the output video frame under a condition that the original video frame does not comprise the privacy information.

According to a third aspect of the embodiments of the present disclosure, a video processing device is provided. The video processing device comprises: a camera configured to acquire video information; an edge device, comprising: a memory configured to store instructions; a processor coupled to the memory, wherein based on the instructions stored in the memory, the processor is configured to: acquire video information collected by a camera; perform video segmentation processing on the video information to obtain an original video frame; detect whether the original video frame comprises privacy information; mask an area comprising the privacy information in the original video frame to generate a masked frame under a condition that the original video frame comprises the privacy information, and take the masked frame as an output video frame; take the original video frame as the output video frame under a condition that the original video frame does not comprise the privacy information.

According to a fourth aspect of embodiments of the present disclosure, a system for protecting privacy is provided. The system comprises: the video processing device according to any one of the embodiments described above; a blockchain node disposed in a blockchain network and configured to store a masked frame sent by the video processing device into a storage server, store access information and verification information of the masked frame and send the access information and the verification information of the masked frame to other blockchain nodes in the blockchain network; the storage server configured to store the masked frame sent by the blockchain node.

In some embodiments, the blockchain node is configured to authenticate the user terminal after receiving an access request sent by the user terminal, and issue a certificate to the user terminal after the authentication is passed, thereby the user terminal acquiring a specified masked frame in the storage server.

In some embodiments, the blockchain node is configured to authenticate the user terminal after receiving an access request sent by the user terminal, and issue a certificate to the user terminal after the authentication is passed, thereby the user terminal acquiring an output video frame of the video processing device by using the certificate.

In some embodiments, the storage server is configured to remove an image mask in the specified masked frame by using a private key to obtain a video frame without the image mask under a condition that the private key provided by the user terminal is received, and send the video frame without the image mask to the user terminal for playing, wherein the private key is obtained from the blockchain node by the user terminal.

In some embodiments, the blockchain node is configured to store a private key corresponding to a public key sent by the video processing device.

According to a fifth aspect of the embodiments of the present disclosure, a non-transitory computer-readable storage medium is provided, wherein the non-transitory computer-readable storage medium stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the disclosure and, together with the description, serve to explain the principles of the disclosure.

The present disclosure may be more clearly understood from the following detailed description with reference to the accompanying drawings, in which.

It should be understood that the dimensions of the various parts shown in the drawings are not drawn to scale. Further, the same or similar reference numerals denote the same or similar components.

DETAILED DESCRIPTION

Various exemplary embodiments of the present disclosure will now be described in detail with reference to the accompanying drawings. The description of the exemplary embodiments is merely illustrative and is in no way intended to limit the disclosure, its application, or uses. The present disclosure may be embodied in many different forms and is not limited to the embodiments described herein. These embodiments are provided so that this disclosure will be thorough and complete, and will fully convey the scope of the disclosure to those skilled in the art. It should be noted that: the relative arrangement of parts and steps, the composition of materials and values set forth in these embodiments are to be construed as illustrative only and not as limiting unless otherwise specifically stated.

The use of "including" or "comprising" and the like in this disclosure is intended to mean that the elements preceding the word encompass the elements listed after the word and does not exclude the possibility that other elements may also be encompassed.

All terms (including technical or scientific terms) used herein have the same meaning as commonly understood by one of ordinary skill in the art to which this disclosure belongs unless specifically defined otherwise. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Techniques, methods, and devices known to one of ordinary skill in the relevant art may not be discussed in detail but are intended to be part of the specification where appropriate.

The inventors have noted that with the development of technology, the more powerful surveillance cameras are, the more likely they are abused to collect privacy information. Security personnel authorized to be in charge of the surveillance system may abuse the camera for peeping and network tracking, and collect data of personal activity or behavior without being authorized. A manipulated camera, such as a pan tilt camera (PTZ (Pan/Tilt/Zoom, horizontal rotation of the Pan/vertical rotation of the Pan/Zoom control of the lens)) may be used to photograph private residences for surveillance. At present, no privacy protection mechanism is set up in surveillance camera systems, such that privacy protection cannot be effectively realized.

Accordingly, the present disclosure provides a solution to protect privacy, which enables a surveillance system to have a privacy perception ability.

Figure 1:
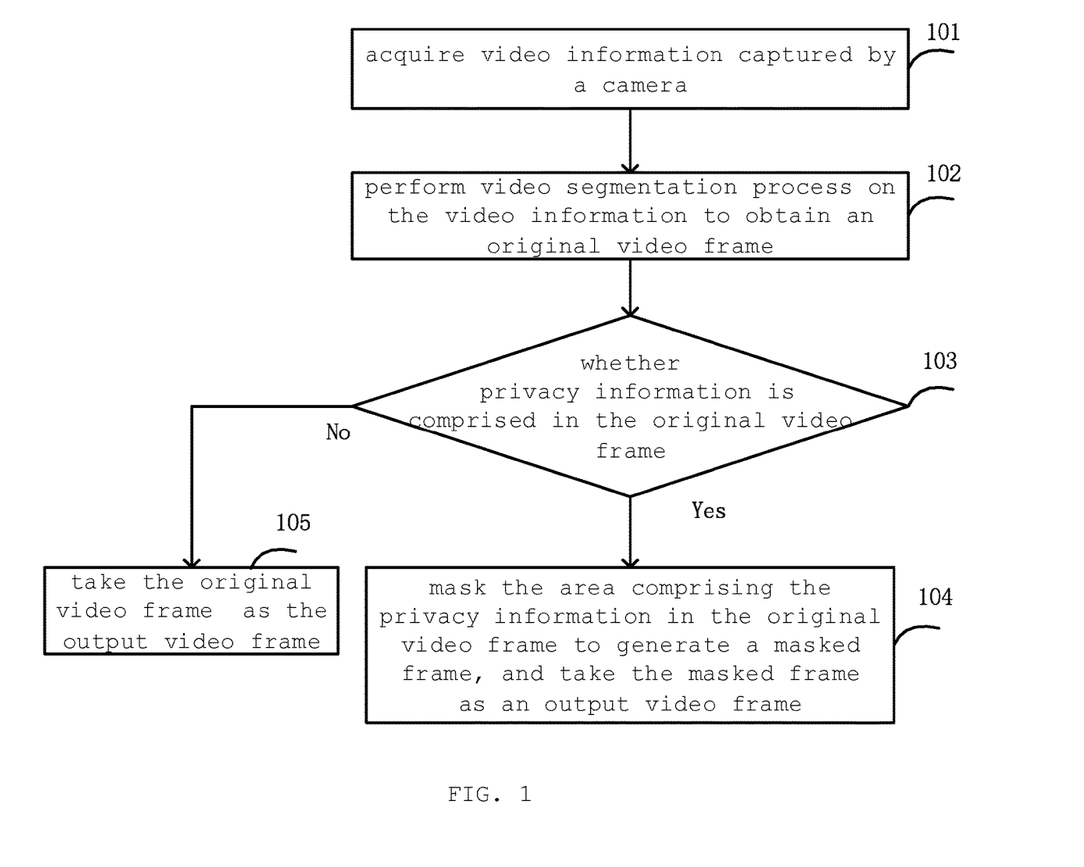
FIG. 1 is a flow diagram of a method for protecting privacy in one embodiment of the present disclosure.

FIG. 1 is a flow diagram of a method for protecting privacy in one embodiment of the present disclosure. In some embodiments, the following steps of the method for protecting privacy are performed by an edge device.

In step 101, video information captured by a camera is acquired.

In step 102, video segmentation process is performed on the video information to obtain an original video frame.

In step 103, it is detected whether privacy information is comprised in the original video frame.

In some embodiments, a Single Board Computer (SBC) is installed on the edge device, such that a trained target detection algorithm is deployed and run on the edge device, and functions such as video analysis, information extraction, object detection and the like are completed, thereby greatly reducing bandwidth consumption.

For example, by loading a trained neural network model on the edge device, the original video frame is examined according to a preset privacy policy to determine whether the original video frame comprises the privacy information.

Under a condition that the original video frame comprises the privacy information, step 104 is performed; under a condition that the original video frame does not comprise the privacy information, step 105 is performed.

In step 104, the area comprising the privacy information in the original video frame is masked to generate a masked frame, and the masked frame is taken as an output video frame.

In some embodiments, an image mask is generated by using a pre-generated public key, and the area comprising the privacy information in an original video frame is masked by the image mask to generate the masked frame. A private key corresponding to the public key is sent to a blockchain node for storing.

Since the masking process is already performed upon the area comprising the privacy information in the output video frame, leakage of the privacy information can be effectively avoided.

In step 105, the original video frame is taken as the output video frame.

In the method for protecting privacy provided by the above embodiment of the present disclosure, the edge device performs masking process on the area comprising the privacy information under a condition that the edge device detects that the video frame comprises the privacy information, thereby effectively implementing protection of the privacy information.

In some embodiments, under a condition that the computing resources of the edge device are limited and not enough to meet the requirements of real-time video analysis, the edge computation and the fog computation may be mixed, and at least a portion of the computation task is loaded into a fog node in its near field, such as a base station, a laptop, a tablet, a smartphone, and the like.

In some embodiments, the edge device further detects whether preset behavior information is comprised in the masked frame, and sends the masked frame to a corresponding blockchain node under a condition that the preset behavior information is comprised in the masked frame, thereby the blockchain node storing the masked frame into a storage server.

For example, the preset behavior may be an illegal criminal behavior, and storing the masked frame in the storage server may provide help to related works in the future.

It should be noted here that the blockchain node only stores address information, authentication information (e.g., hash, digest, etc.), related access information, and the like associated with the stored video frame. For example, after receiving a video frame sent by an edge device, a blockchain node in the blockchain network calculates a hash of the video frame. After storing the video frame in the storage server, the blockchain node stores the corresponding hash and address information, and floods the stored hash and address information to other blockchain nodes in the blockchain network. The blockchain node that receives the information accesses the video frame and computes a hash of the video frame. By comparing the computed hash with the received hash to ensure the integrity of the video frame, it is effectively ensured that the video frame is not tampered with.

Figure 2:
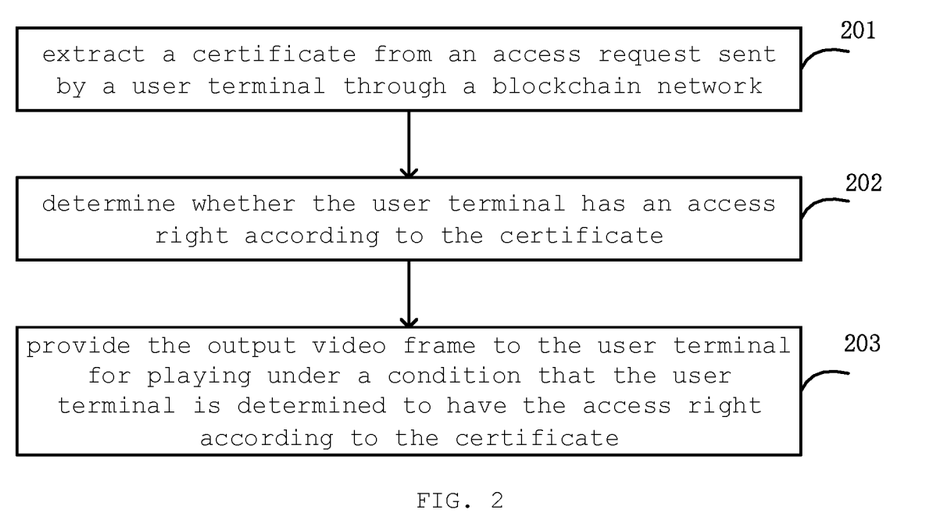
FIG. 2 is a flow diagram of a method for protecting privacy in another embodiment of the present disclosure.

FIG. 2 is a flow diagram illustrating a method for protecting privacy in another embodiment of the disclosure. In some embodiments, the following steps of the method for protecting privacy are performed by an edge device.

In step 201, a certificate is extracted from an access request sent by a user terminal through a blockchain network.

It should be noted that, the blockchain node performs authentication on the user terminal under a condition that the user terminal accesses the blockchain node, and issues a corresponding certificate to the user terminal after the authentication is passed.

In step 202, it is determined whether the user terminal has an access right according to the certificate.

In step 203, the output video frame is provided to the user terminal for playing under a condition that the user terminal is determined to have the access right according to the certificate.

That is, under a condition that the certificate indicates that the user terminal has the right to access the edge device, the user terminal accesses the edge device, such that the user views the real-time video output by the edge device. Since the edge device outputs the video frame without the privacy information directly, the user watches a clear frame without a mask. In addition, the edge device adds an image mask to the video frame that relates to the privacy information, such that what the user watches is the masked frame.

In some embodiments, under a condition that the user wishes to watch a video frame without an image mask, the user would sends a request for a private key to the blockchain node using the user terminal. And after verifying the authority of the user terminal, the blockchain node sends a private key associated with the edge device accessed by the user terminal to the user terminal. After receiving the private key provided by the user terminal, the edge device removes the image mask of the masked frame in the output video frame by using the private key, such that the video frame without the image mask is obtained. Thus, none of the video frames watched by the user comprises an image mask.

In some embodiments, the edge device detects the number of the generated masked frames in the process of providing the output video frames to the user terminal. If the number of the generated masked frames is larger than a preset threshold, the connection between the edge device and the blockchain network is interrupted.

For example, a user is authorized to access an edge device via a blockchain network to view real-time video information in a public area. If the user captures the images of personal residences by manipulating the direction of the camera and peeping through the windows of the houses for a user's privacy, in this process, the edge device will generate a large amount of masked frames, and in this case, the edge device is triggered to exit the blockchain network, such that the situation that the user exceeds the authorized range to peep the privacy of the user is effectively avoided.

In some embodiments, the connection between the edge device and the blockchain network is interrupted according to an instruction of interruption sent by the user terminal in the process of providing the output video frame to the user terminal.

For example, an unmanned aerial vehicle provided with the above mentioned edge device may capture more user privacy in some scenes, and the edge device may generate a large number of masked frames. In this case, the authorized user sends an instruction to the edge device to trigger the edge device to exit the blockchain network, thereby ensuring that the edge device is as little involved in user privacy information as possible.

Figure 3:
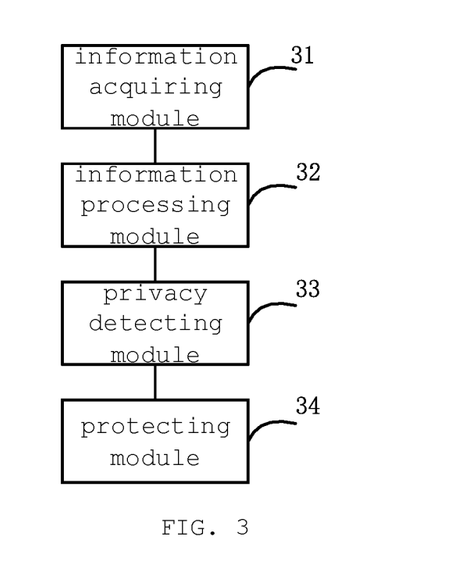
FIG. 3 is a schematic structural diagram of an edge device for protecting privacy in one embodiment of the present disclosure.

FIG. 3 is a schematic structural diagram of an edge device for protecting privacy according to an embodiment of the present disclosure. As shown in FIG. 3, the edge device comprises an information acquiring module 31, an information processing module 32, a privacy detecting module 33, and a protecting module 34.

The information acquiring module 31 is configured to acquire video information collected by a camera.

The information processing module 32 is configured to perform video segmentation processing on the video information to obtain an original video frame.

The privacy detection module 33 is configured to detect whether privacy information is comprised in the original video frame.

For example, by loading a trained neural network model on the edge device, the original video frame is examined according to a preset privacy policy to determine whether the original video frame comprises privacy information.

The protecting module 34 is configured to mask an area of the original video frame that comprises the privacy information to obtain a masked frame under a condition the original video frame comprises the privacy information, and take the masked frame as an output video frame.

In some embodiments, the protecting module 34 generates an image mask using a pre-generated public key, masks an area of the original video frame that comprises the privacy information with the image mask to generate the masked frame, and sends a private key corresponding to the public key to the blockchain node for storing.

The protecting module 34 is further configured to take the original video frame as the output video frame under a condition that the original video frame does not comprise privacy information.

The edge device for protecting privacy provided by the above embodiment of the present disclosure performs masking process on the area comprising the privacy information under a condition that the edge device detects that the video frame comprises the privacy information, thereby effectively implementing protection of the privacy information.

In some embodiments, under a condition that the computing resources of the edge device are limited and not enough to meet the requirements of real-time video analysis, the edge computation and the fog computation may be mixed, and at least a portion of the computation task is loaded into a fog node in its near field, such as a base station, a laptop, a tablet, a smartphone, and the like.

In some embodiments, the protecting module 34 further detects whether the masked frames comprise preset behavior information, and the protecting module 34 sends the masked frame to the corresponding blockchain node under a condition that the masked frames comprise the preset behavior information, such that the blockchain node stores the masked frames in the storage server.

For example, the preset behavior may be an illegal criminal behavior, and storing the masked frame in the storage server may provide help to related works in the future.

In some embodiments, the protecting module 34 extracts a certificate from the access request sent by the user terminal through the blockchain network, and determines whether the user terminal has the access right according to the certificate. The protecting module 34 provides the output video frame to the user terminal for playing under a condition that the user terminal is determined to have the access right according to the certificate.

That is, under a condition that the certificate indicates that the user terminal has the right to access the edge device, the user terminal accesses the edge device, such that the user views the real-time video output by the edge device. Since the edge device outputs the video frame without the privacy information directly, the user watches a clear frame without a mask. In addition, the edge device adds an image mask to the video frame that relates to the privacy information, such that what the user watches is the masked frame.

In some embodiments, under a condition that the user wishes to watch a video frame without an image mask, the user would sends a request for a private key to the blockchain node using the user terminal. And after verifying the authority of the user terminal, the blockchain node sends a private key associated with the edge device accessed by the user terminal to the user terminal. After receiving the private key provided by the user terminal, the protecting module 34 removes the image mask of the masked frame in the output video frame by using the private key, such that the video frame without the image mask is obtained. Thus, none of the video frames watched by the user comprises an image mask.

In some embodiments, the protection module 34 detects the number of the generated masked frames in the process of providing the output video frames to the user terminal. If the number of the generated masked frames is larger than a preset threshold, the connection between the edge device and the blockchain network is interrupted.

In some embodiments, the protection module 34 interrupts the connection between the edge device and the blockchain network according to an instruction of interruption sent by the user terminal in the process of providing the output video frame to the user terminal.

Figure 4:
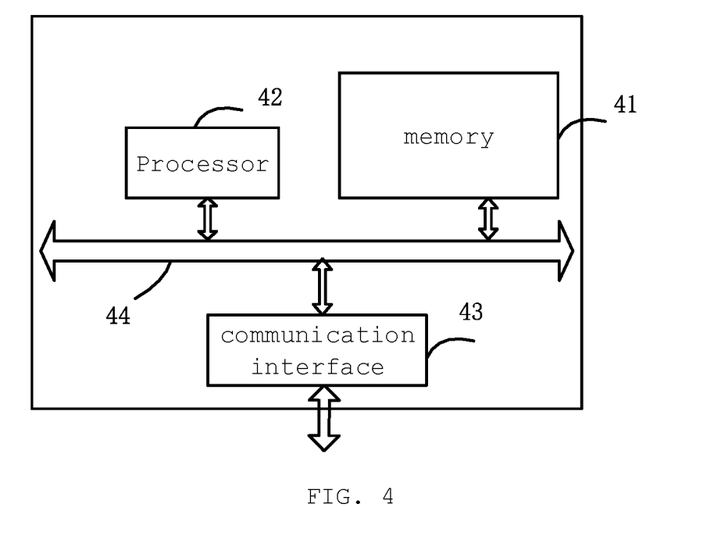
FIG. 4 is a schematic structural diagram of an edge device for protecting privacy in another embodiment of the present disclosure.

FIG. 4 is a schematic structural diagram of an edge device for protecting privacy according to another embodiment of the present disclosure. As shown in FIG. 4, the edge device comprises a memory 41 and a processor 42.

The memory 41 is used for storing instructions, the processor 42 is coupled to the memory 41, and the processor 42 is configured to perform the method according to any of the embodiments in FIG. 1 or FIG. 2 based on the instructions stored in the memory.

As shown in FIG. 4, the edge device further comprises a communication interface 43 for information interaction with other devices. Meanwhile, the edge device further comprises a bus 44, and the processor 42, the communication interface 43, and the memory 41 communicate with each other through the bus 44.

The memory 41 may comprise high-speed RAM memory, and may also comprise a non-volatile memory, such as at least one disk memory. The memory 41 may also be a memory array. The storage 41 may also be partitioned into blocks, and the blocks may be combined into virtual volumes according to certain rules.

Further, the processor 42 may be a central processing unit CPU, or may be an application specific integrated circuit ASIC, or one or more integrated circuits configured to implement embodiments of the present disclosure.

The present disclosure also relates to a non-transitory computer-readable storage medium, in which computer instructions are stored, and when executed by a processor, the instructions implement the method according to any one of the embodiments in FIG. 1 or FIG. 2.

Figure 5:
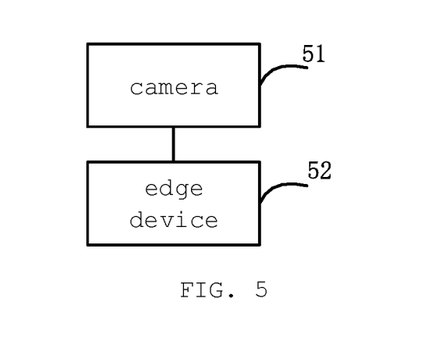
FIG. 5 is a schematic structural diagram of a video processing device in one embodiment of the disclosure.

FIG. 5 is a schematic structural diagram of a video processing device according to an embodiment of the present disclosure. As shown in FIG. 5, the video processing device comprises a camera 51 and an edge device 52. The edge device 52 is the edge device according to any of the embodiments of FIG. 3 or FIG. 4.

Figure 6:
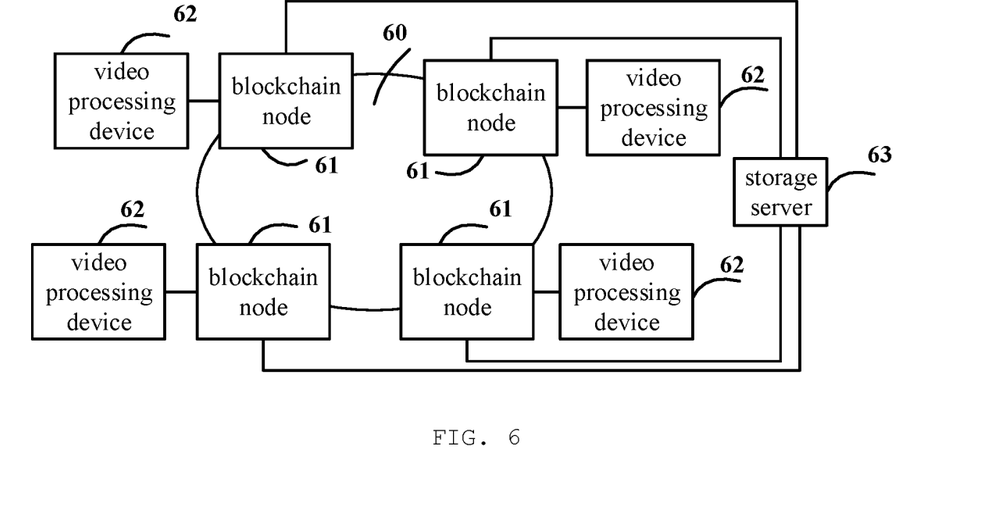
FIG. 6 is a schematic structural diagram of a system for protecting privacy in one embodiment of the present disclosure.

FIG. 6 is a schematic structural diagram of a system for protecting privacy according to an embodiment of the present disclosure. As shown in FIG. 6, the system comprises a blockchain node 61, a video processing device 62 and a storage server 63 disposed in a blockchain network 60. It should be noted that the number of blockchain nodes 61, video processing devices 62 and storage servers 63 may be adjusted as needed. The video processing device 62 is the video processing device according to any of the embodiments in FIG. 5.

The blockchain node 61 is configured to store the masked frames sent by the video processing device 62 in the storage server 63, record access information and authentication information of the masked frames, and send the access information and authentication information of the masked frames to other blockchain nodes in the blockchain network 60.

Storage server 63 is configured to store the masked frames sent by the blockchain node.

In some embodiments, the blockchain node 61 is configured to authenticate the user terminal after receiving the access request sent by the user terminal, and issue a certificate to the user terminal after the authentication is passed, thereby the user terminal acquiring an output video frame of the video processing device 62 by using the certificate, or acquiring a specified masked frame in the storage server.

After passing the authentication, the user terminal accesses the specified video processing device by using the certificate issued by the blockchain node, such that the user can watch real-time video information, wherein the real-time video information comprises the video frames without image masks and the video frames with image masks. In addition, after passing the authentication, the user terminal can also access the masked frame of the specified video frame in the storage server by using the certificate issued by the blockchain node.

It should be noted here that all the video frames in the storage server 63 are masked frames. If the user wishes to view video frames without the image mask, the user sends a private key request to the blockchain node 61 using the user terminal. After verifying the authority of the user terminal, the blockchain node 61 sends a private key associated with the edge device accessed by the user terminal to the user terminal. After receiving the private key provided by the user terminal, the storage server 63 removes the image mask of the masked frame in the output video frame by using the private key, such that the video frame without the image mask is obtained. Thus, none of the video frames watched by the user comprises an image mask.

In some embodiments, the functional unit modules described above can be implemented as a general purpose processor, a programmable logic controller (PLC), a digital signal processor (DSP), an application specific integrated circuit (ASIC), a field programmable gate array (FPGA) or other programmable logic devices, discrete gates or transistor logics, discrete hardware components, or any suitable combination thereof for performing the functions described in this disclosure.

So far, embodiments of the present disclosure have been described in detail. Some details well known in the art have not been described in order to avoid obscuring the concepts of the present disclosure. Those skilled in the art can now fully appreciate how to implement the technical solution disclosed herein, in view of the foregoing description.

Although some specific embodiments of the present disclosure have been described in detail by way of examples, it should be understood by those skilled in the art that the above examples are for illustration only rather than intended to limit the scope of the present disclosure. It will be understood by those skilled in the art that various changes may be made and equivalents may be substituted for part of the technical features without departing from the scope and spirit of the present disclosure. The scope of the present disclosure is defined by the appended claims.

What is claimed is:

1. A method for protecting privacy executed by an edge device, comprising:
    acquiring video information collected by a camera;
    performing video segmentation processing on the video information to obtain an original video frame;
    detecting whether the original video frame comprises privacy information;
    masking an area comprising the privacy information in the original video frame to generate a masked frame under a condition that the original video frame comprises the privacy information, and taking the masked frame as an output video frame, wherein the masking the area comprising the privacy information in the original video frame comprises generating an image mask by using a pre-generated public key, and shielding the area comprising the privacy information in the original video frame by the image mask to generate the masked frame;
    taking the original video frame as the output video frame under a condition that the original video frame does not comprise the privacy information;
    extracting a certificate from an access request sent by a user terminal through a blockchain network, wherein the certificate is issued by the blockchain node to the user terminal after the user terminal passes authentication;
    determining whether the user terminal has an access right according to the certificate;
    providing the output video frame to the user terminal for playing under a condition that the user terminal is determined to have the access right according to the certificate;
    detecting the number of generated masked frames in the process of providing the output video frame to the user terminal; and
    interrupting a connection between the edge device and the blockchain network under a condition that the number of the generated masked frames is greater than a preset threshold.

2. The method according to claim 1, further comprising:
    detecting whether the masked frame comprises preset behavior information; and
    sending the masked frame to a corresponding blockchain node under a condition that the masked frame comprises the preset behavior information, thereby the blockchain node storing the masked frame into a storage server.

3. The method according to claim 1, further comprising:
    removing the image mask of the masked frame in the output video frame by using the private key to obtain a video frame without the image mask under a condition that a private key provided by the user terminal is received, wherein the private key is obtained from a blockchain node by the user terminal;

sending the video frame without the image mask to the user terminal for playing.

4. The method according to claim 1, further comprising: interrupting the connection between the edge device and the blockchain network according to an instruction of interruption sent by the user terminal in the process of providing the output video frame to the user terminal.

5. An edge device for protecting privacy, comprising:
a memory configured to store instructions; and
a processor coupled to the memory, wherein based on the instructions stored in the memory, the processor is configured to:
acquire video information collected by a camera;
perform video segmentation processing on the video information to obtain an original video frame;
detect whether the original video frame comprises privacy information;
mask an area comprising the privacy information in the original video frame to generate a masked frame under a condition that the original video frame comprises the privacy information, and take the masked frame as an output video frame, wherein mask the area comprising the privacy information in the original video frame comprises generating an image mask by using a pre-generated public key, and shielding the area comprising the privacy information in the original video frame by the image mask to generate the masked frame;
take the original video frame as the output video frame under a condition that the original video frame does not comprise the privacy information;
extract a certificate from an access request sent by a user terminal through a blockchain network, wherein the certificate is issued by the blockchain node to the user terminal after the user terminal passes authentication;
determine whether the user terminal has an access right according to the certificate;
provide the output video frame to the user terminal for playing under a condition that the user terminal is determined to have the access right according to the certificate;
detect the number of generated masked frames in the process of providing the output video frame to the user terminal; and
interrupt a connection between the edge device and the blockchain network under a condition that the number of the generated masked frames is greater than a preset threshold.

6. A video processing device, comprising:
a camera configured to acquire video information; and
an edge device, comprising:
a memory configured to store instructions;
a processor coupled to the memory, wherein based on the instructions stored in the memory, the processor is configured to:
acquire video information collected by a camera;
perform video segmentation processing on the video information to obtain an original video frame;
detect whether the original video frame comprises privacy information;
mask an area comprising the privacy information in the original video frame to generate a masked frame under a condition that the original video frame comprises the privacy information, and take the masked frame as an output video frame, wherein mask the area comprising the privacy information in the original video frame comprises generating an image mask by using a pre-generated public key, and shielding the area comprising the privacy information in the original video frame by the image mask to generate the masked frame;
take the original video frame as the output video frame under a condition that the original video frame does not comprise the privacy information;
extract a certificate from an access request sent by a user terminal through a blockchain network, wherein the certificate is issued by the blockchain node to the user terminal after the user terminal passes authentication;
determine whether the user terminal has an access right according to the certificate;
provide the output video frame to the user terminal for playing under a condition that the user terminal is determined to have the access right according to the certificate;
detect the number of generated masked frames in the process of providing the output video frame to the user terminal; and
interrupt a connection between the edge device and the blockchain network under a condition that the number of the generated masked frames is greater than a preset threshold.

7. A system for protecting privacy, comprising:
the video processing device according to claim 6;
a blockchain node disposed in a blockchain network and configured to store a masked frame sent by the video processing device into a storage server, store access information and verification information of the masked frame and send the access information and the verification information of the masked frame to other blockchain nodes in the blockchain network;
the storage server configured to store the masked frame sent by the blockchain node.

8. The system according to claim 7, wherein
the blockchain node is configured to authenticate the user terminal after receiving an access request sent by the user terminal, and issue a certificate to the user terminal after the authentication is passed, thereby the user terminal acquiring a specified masked frame in the storage server.

9. The system according to claim 8, wherein
the storage server is configured to remove an image mask in the specified masked frame by using a private key to obtain a video frame without the image mask under a condition that the private key provided by the user terminal is received, and send the video frame without the image mask to the user terminal for playing, wherein the private key is obtained from the blockchain node by the user terminal.

10. A non-transitory computer-readable storage medium, which stores computer instructions that, when executed by a processor, implement the method of claim 1.

11. The method according to claim 1, wherein the masking the area comprising the privacy information in the original video frame further comprises:
sending a private key corresponding to the public key to the blockchain node, thereby the blockchain node storing the private key.

12. The system according to claim 7, wherein
the blockchain node is configured to authenticate the user terminal after receiving an access request sent by the user terminal, and issue a certificate to the user terminal after the authentication is passed, thereby the user terminal acquiring an output video frame of the video processing device by using the certificate.

13. The system according to claim 7, wherein
the blockchain node is configured to store a private key corresponding to a public key sent by the video processing device.

* * * * *